United States Patent
Nakamichi et al.

(10) Patent No.: US 6,859,842 B1
(45) Date of Patent: Feb. 22, 2005

(54) METHOD AND APPARATUS FOR SELECTION OF PATHS ON A COMMUNICATION NETWORK

(75) Inventors: Koji Nakamichi, Kawasaki (JP); Yutaka Ezaki, Kawasaki (JP); Toshio Soumiya, Kawasaki (JP); Kenya Takashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 782 days.

(21) Appl. No.: 09/709,230

(22) Filed: Nov. 9, 2000

(30) Foreign Application Priority Data

Nov. 11, 1999 (JP) .......................................... 11-321591

(51) Int. Cl.[7] .......................................... G06F 15/173
(52) U.S. Cl. ..................................... 709/238; 709/240
(58) Field of Search ............................... 709/238, 240, 709/241, 226; 370/252, 389, 397, 399; 718/105

(56) References Cited

U.S. PATENT DOCUMENTS 6,584,071 B1 * 6/2003 Kodialam et al. .......... 370/238

FOREIGN PATENT DOCUMENTS

| EP | 0 753 979 | 1/1997 |
| JP | 6-6381 | 1/1994 |
| JP | 7-115434 | 5/1995 |

OTHER PUBLICATIONS

Rosen, et al., "Multiprotocol Label Switching Architecture" IETF, Network Working Group, 'Online! Aug. 1999; XP002248983; URL:www.ietf.org pp. 1–45.

Widjaja, et al., "Mate: MPLS Adaptive Traffice Engineering" IETF, Draft Online! Oct. 1999; XP002248984 URL: www.ietf.org , pp. 1–12.

Awduche, et al., "Requirements for Traffic Engineering Over MPLS" IETF Network Working Group Draft Sep. 1999; XP002258996, pp. 1–29.

Takashima, et al., "Concept of IP Traffic Engineering" IETF Network Working Group Draft Oct. 1999; XP002258997, pp. 1–11.

* cited by examiner

Primary Examiner—Mehmet B. Geckil
(74) Attorney, Agent, or Firm—Katten Muchin Zavis Rosenman

(57) ABSTRACT

A method and apparatus for selecting paths to route incoming traffic through a data communication network, which is capable of effectively dispersing the traffic load to the selected paths on the network and effectively optimizing the use of network resources. In a communication network, a plurality of label switched paths between an ingress node and an egress node are provided. Incoming traffic at the ingress node is labeled and delivered through the network to the egress node. In a method and apparatus for selecting paths to route the incoming traffic through the network, a plurality of forwarding equivalent class elements (FEC) of the incoming traffic at the ingress node are allocated for the plurality of label switched paths. The labeled traffic is delivered on the plurality of label switched paths on an FEC-element basis so as to route the labeled traffic through the network to the egress node. The traffic load on the respective label switched paths can be effectively dispersed and the sequence of data packets, sent by the same terminal, may be maintained.

33 Claims, 14 Drawing Sheets

| FEC ID | SOURCE IP ADDRESS | DESTINATION IP ADDRESS | SOURCE TCP/UDP PORT ID | DESTINATION TCP/UDP PORT ID | FEC PRIORITY |
|---|---|---|---|---|---|
| #1 | nul1 | 10.25.1.1 | nul1 | nul1 | 1 |
| #2 | nul1 | 10.25.2.0/24 | nul1 | nul1 | 1 |
| #3 | 1.2.3.4 | nul1 | 20 | 20 | 0 |
| #4 | nul1 | 10.25.3.0/24 | 80 | 80 | 0 |
| ... | ... | ... | ... | ... | ... |

FIG. 3

| FEC ID | LABEL VALUE | OUTPUT PORT ID |
|---|---|---|
| #1 | L0 | P0 |
| #2 | L1 | P1 |
| #3 | L2 | P2 |
| #4 | L3 | P2 |
| ⋮ | ⋮ | ⋮ |

FIG. 4

| FEC ID | LABEL VALUE | OUTPUT PORT ID |
| --- | --- | --- |
| #1 | L0 | P0 |
| #2 | L0 | P0 |
| #3 | L1 | P1 |
| #4 | L1 | P1 |
| #5 | L2 | P2 |
| #6 | L2 | P2 |
| #7 | L3 | P3 |
| #8 | L3 | P3 |
| #9 | L4 | P4 |
| #10 | L4 | P4 |

FIG. 5

| FEC ID | LABEL VALUE | OUTPUT PORT ID | |
|---|---|---|---|
| #1 | L0 | P0 | } PHYSICAL LINK 1 |
| #2 | L1 | P1 | |
| #3 | L2 | P1 | } PHYSICAL LINK 2 |
| #4 | L3 | P1 | |
| #5 | L4 | P2 | |
| #6 | L5 | P2 | |
| #7 | L6 | P2 | |
| #8 | L7 | P2 | } PHYSICAL LINK 3 |
| #9 | L8 | P2 | |
| #10 | L9 | P2 | |

FIG. 6

| FEC ID | LABEL VALUE | OUTPUT PORT ID | |
|---|---|---|---|
| #1 | L0 | P0 | } PHYSICAL LINK 1 |
| #2 | L1 | P0 | |
| #3 | L2 | P1 | } PHYSICAL LINK 2 |
| #4 | L3 | P1 | |
| #5 | L4 | P1 | |
| #6 | L5 | P1 | |
| #7 | L6 | P1 | |
| #8 | L7 | P2 | } PHYSICAL LINK 3 |
| #9 | L8 | P2 | |
| #10 | L9 | P2 | |

FIG. 7

| FEC ID | LABEL VALUE | OUTPUT PORT ID |
|---|---|---|
| #1 | L0 | P0 |
| #2 | L1 | P0 |
| #3 | L2 | P0 |
|  |  |  |
|  |  |  |
|  |  |  |

PHYSICAL LINK 1 (HIGH PRIORITY)

TIME POINT THAT AMOUNT OF TRAFFIC ON LINK 1 EXCEEDS THRESHOLD

FIG. 8

| FEC ID | LABEL VALUE | OUTPUT PORT ID | |
|--------|-------------|----------------|---|
| #1 | L0 | P0 | PHYSICAL LINK 1 (HIGH PRIORITY) |
| #2 | L1 | P0 | |
| #3 | L2 | P0 | |
| #4 | | P1 | PHYSICAL LINK 2 (LOW PRIORITY) |
| #5 | | P1 | |

FIG. 9

| FEC PRIORTY CLASS | OUTPUT LABEL | OUTPUT PORT ID | |
|---|---|---|---|
| 0 | L0 | P0 | PHYSICAL LINK 1 (HIGH PRIORITY) |
| 1 | L1 | P1 | PHYSICAL LINK 2 |
| 2 | L2 | P2 | PHYSICAL LINK 3 |
| 3 | L3 | P3 | PHYSICAL LINK 4 |
| 4 | L4 | P4 | |
| 5 | L4 | P4 | PHYSICAL LINK 5 (LOW PRIORITY) |
| 6 | L4 | P4 | |
| 7 | L4 | P4 | |

FIG. 10

METHOD AND APPARATUS FOR SELECTION OF PATHS ON A COMMUNICATION NETWORK

FIELD OF THE INVENTION

The present invention relates to a method and apparatus for selecting paths to route incoming traffic through a data communication network in which a plurality of label switched paths between the ingress node a nd the egress node of the network are provided, and in which the incoming traffic at the ingress node is labeled and delivered through the network to the egress node.

BACKGROUND OF THE INVENTION

Recently, there is a rapid growth of Internet communications since various Internet Protocol (IP)-based applications have become available. Multiprotocol Label Switching (MPLS) is an evolving standard that is intended for such Internet applications.

Multiprotocol Label Switching (MPLS) is a widely supported method of speeding up IP-based data communication over communication networks, such as asynchronous transfer mode (ATM) networks. As IP and ATM come together, the MPLS concept is to route a packet at the edge of the network and switch the packet in the core of the network. In other words, routers are used at the ingress and egress edges of the network, where their high levels of intelligence can be best used and where their inherent slowness can be tolerated. Switches are used in the core of the network, where they can take advantage of the intelligent routing instructions provided by the routers, and where their inherent speed offers great advantage.

In an MPLS network, an IP data stream enters the edge of the network, and the ingress router reads the full address of the first data packet and attaches a small label in the packet header, which precedes the packet. The ATM switches in the core of the network examine the much-abbreviated label, and switch the packet with much greater speed than if they were forced to consult programmed routing tables associated with the full IP address. All subsequent packets in a data stream are automatically labeled in this manner, and very quickly switched as they have been anticipated.

In the MPLS scheme, a plurality of label switched paths (LSP) between the ingress node and the egress node on the network are provided, and a data packet with a fixed-size label attached is delivered on the plurality of LSPs. The routers at nodes of the MPLS network are called label switching routers (LSR) in this scheme. The label switching routers can deliver the incoming packet on the LSPs by reading the address information of the packet in the fixed-size label. By making use of the MPLS scheme, it is expected that the IP-based data communication over the communication networks can be speeded up and the concentration of traffic load on a specific path of the network can be avoided.

Further, there has been of great interest in that the scheme of MPLS adaptive traffic engineering (often called MATE) has the potential for more effectively optimizing the use of network resources as compared with that in the conventional IP-based communication networks. In order to achieve this scheme, it is desired to provide a data communication network having a capability of selecting a plurality of paths passing through a router at an arbitrary node of the network when transmitting data on the network.

Further, the concept of the MPLS does not rely on the communication medium through which data is transmitted. In the above-described MPLS scheme, data communication may be carried out through any communication media, including an ATM network, a frame relay network, a point-to-point link, etc. In a case of the ATM network, the label provided by the MPLS scheme is attached in the VPI/VCO field of an ATM cell header. The ATM network is a high-speed scheme using the transmission of fixed-size cells and intended for broadband integrated services digital network (B-ISDN) services. The ATM network is currently implemented in various areas of the field and provided with an adequate capability of supporting quality-of-service (QOS) classes for the expected B-ISDN services.

In the existing IP packet-switched network, such as the Internet, the routing of an incoming packet through the network is determined according to the existing routing protocol in a self-controlled manner. For example, the Open Shortest Path First (OSPF) algorithm is a typical one of the routing protocols that have been commonly used. The OSPF algorithm is a link-state routing algorithm that is used to calculate routes based on the number of routers, transmission speed, delays and route cost. When the OSPF algorithm is used as the routing protocol, the shortest path of the packet to its destination router on the network is automatically selected first.

However, the above-mentioned routing protocol, that is, selecting the shortest path on the network first, does not always result in an efficient use of the network resources. For example, when the channel capacity of the link on the selected shortest path is less than the data rate of the incoming packets, the traffic load on the shortest path becomes too heavy, which will cause a congestion condition of the path in the network.

Further, in the case of the above-mentioned routing protocol, a single path for routing the packet to its destination router on the network is automatically selected. It is impossible that the above routing protocol is used to select two or more paths for routing the packet to its destination on the network. Hence, when the above routing protocol is used, it is difficult to disperse the incoming traffic load to the two or more paths within the network.

Accordingly, it is an object of the present invention to provide a novel, useful method and apparatus for selection of paths to route an incoming traffic through a data communication network, which is capable of effectively dispersing the traffic load to the selected paths on the network and effectively optimizing the use of network resources.

SUMMARY

In order to overcome the above-described problems and achieve the above-described object of the present invention, the invention provides a method for selecting paths to route incoming traffic through a communication network in which a plurality of label switched paths between an ingress node and an egress node are provided, and the incoming traffic at the ingress node is labeled and delivered through the network to the egress node, the method includes allocating a plurality of forwarding elements of the incoming traffic at the ingress node for the plurality of label switched paths; and delivering the labeled traffic on the plurality of label switched paths on a forwarding element basis so as to route the labeled traffic through the network to the egress node.

The above-described invention may further equally allocate the forwarding elements for the plurality of label switched paths.

According to the above-described invention, the method for selection of paths to route the incoming traffic through the communication network is effective in dispersing the traffic load to the selected paths on the network and in optimizing the use of network resources. Reversing of a sequence (receiving out of order) of data packets sent by the same terminal at the egress node of the network can be effectively reduced.

A further embodiment provides a method for selection of paths to route incoming traffic through a communication network in which a plurality of label switched paths between an ingress node and an egress node are provided, and the incoming traffic at the ingress node is labeled and delivered through the network to the egress node, the method includes allocating a plurality of forwarding equivalent class (FEC) elements of the incoming traffic at the ingress node for the plurality of label switched paths, the respective label switched paths being tied to physical links having predetermined data rates, and the number of FEC elements allocated for each of the label switched paths being proportional to the predetermined data rate of the label switched path; and delivering the labeled traffic on the plurality of label switched paths on an FEC-element basis so as to route the labeled traffic through the network to the egress node.

According to the above-described invention, the method for selection of paths to route the incoming traffic through the communication network is effective in dispersing the traffic load to the selected paths on the network and in optimizing the use of network resources. Concentration of the traffic load on a specific path of the network can be effectively avoided.

Another method for the selection of paths to route incoming traffic through a communication network in which a plurality of label switched paths between an ingress node and an egress node are provided, and the incoming traffic at the ingress node is labeled and delivered through the network to the egress node, the method includes allocating a plurality of FEC elements of the incoming traffic at the ingress node for the plurality of label switched paths, the respective label switched paths being tied to physical links having predetermined weight factors, and the number of FEC elements allocated for each of the label switched paths being proportional to the predetermined weight factor of the physical links; and delivering the labeled traffic on the plurality of label switched paths on an FEC-element basis so as to route the labeled traffic through the network to the egress node.

According to the above-described invention, the method for selection of paths to route the incoming traffic through the communication network is effective in dispersing the traffic load to the selected paths on the network and in optimizing the use of network resources. The traffic load dispersion to the selected paths can be effectively suited to the network management conditions specified by a network administrator.

The invention further provides a method for selection of paths to route an incoming traffic through a communication network in which a plurality of label switched paths between an ingress node and an egress node are provided, and the incoming traffic at the ingress node is labeled and delivered through the network to the egress node, the method includes assigning one of a set of priorities for each of the plurality of physical links and the plurality of label switched paths being allocated to the physical links; allocating a plurality of forwarding equivalent class (FEC) elements of the incoming traffic at the ingress node for the plurality of label switched paths in order of the respective priorities of the plurality of physical links until an amount of the traffic delivered on one of the plurality of physical links having a first priority; and delivering the labeled traffic on the plurality of label switched paths on an FEC-element basis so as to route the labeled traffic through the network to the egress node, wherein, after the amount of the traffic delivered on the one of the plurality of physical links has exceeded the predetermined threshold, the traffic is routed to others of the plurality of label switched paths having physical links of a second priority lower than the first priority of the one of the plurality of physical links.

According to the above-described invention, the method for selection of paths to route the incoming traffic through the communication network is effective in dispersing the traffic load to the selected paths on the network and in optimizing the use of network resources. By assigning the first priority for main route paths of the network and the second priority for sub-route paths of the network, the traffic load dispersion to the selected paths can be effectively achieved.

Another embodiment provides a method for selecting paths to route incoming traffic through a communication network in which a plurality of label switched paths between an ingress node and an egress node are provided, and the incoming traffic at the ingress node is labeled and delivered through the network to the egress node, the method includes allocating a plurality of FEC priorities for a plurality of forwarding equivalent class FEC elements of the incoming traffic at the ingress node; assigning one of a set of priorities for each of the plurality of physical links and allocating the plurality of label switched paths to the plurality of physical links; allocating the plurality of FEC elements of the incoming traffic at the ingress node for the plurality of label switched paths in order of the respective priorities of the plurality of physical links and in order of the respective FEC priorities of the plurality of FEC elements; and delivering the labeled traffic on the plurality of label switched paths on an FEC-element basis so as to route the labeled traffic through the network to the egress node.

According to the above-described invention, the method for selection of paths to route the incoming traffic through the communication network is effective in dispersing the traffic load to the selected paths on the network and in optimizing the use of network resources. The traffic load dispersion to the selected paths can be achieved with increased flexibility by the allocation of the path priorities and the FEC priorities specified by a network administrator.

The invention provides an ingress-node apparatus for path selection to route incoming traffic through a communication network in which a plurality of label switched paths between an ingress node and an egress node are provided, and the incoming traffic at the ingress node is labeled and delivered through the network to the egress node. An FEC allocation unit equally allocates a plurality of FEC elements of the incoming traffic at the ingress node for the plurality of label switched paths; and a traffic delivery unit which delivers the labeled traffic on the plurality of label switched paths on an FEC-element basis so as to route the labeled traffic through the network to the egress node.

According to the above-described invention, the selection of paths to route the incoming traffic through the communication network is effective in dispersing the traffic load to the selected paths on the network and in optimizing the use of network resources. Reversing of a sequence of data packets sent by the same terminal (packets out of order), at the egress node of the network can be effectively reduced.

The invention further provides an ingress-node apparatus for selection of paths to route incoming traffic through a communication network in which a plurality of label switched paths between an ingress node and an egress node are provided, and the incoming traffic at the ingress node is labeled and delivered through the network to the egress node. An FEC allocation unit which allocates a plurality of forwarding equivalent class FEC elements of the incoming traffic at the ingress node for the plurality of label switched paths, the respective label switched paths being tied to a a plurality of physical links having predetermined data rates, and the number of FEC elements allocated for each of the label switched paths being proportional to the predetermined data rate of the physical links. A traffic delivery unit delivers the labeled traffic on the plurality of label switched paths on a FEC-element basis so as to route the labeled traffic through the network to the egress node.

According to the above-described invention, the apparatus for selection of paths to route the incoming traffic through the communication network is effective in dispersing the traffic load to the selected paths on the network and in optimizing the use of network resources. Concentration of the traffic load on a specific path of the network can be effectively avoided.

Another embodiment provides an ingress-node apparatus for selection of paths to route incoming traffic through a communication network in which a plurality of label switched paths between an ingress node and an egress node are provided, and the incoming traffic at the ingress node is labeled and delivered through the network to the egress node, the apparatus including: an FEC allocation unit which allocates a plurality of forwarding equivalent class FEC elements of the incoming traffic at the ingress node for the plurality of label switched paths, the respective label switched paths being tied to a plurality of physical links having predetermined weight factors, and the number of FEC elements allocated for each of the label switched paths being proportional to the predetermined weight factor of the physical link; and a traffic delivery unit which delivers the labeled traffic on the plurality of label switched paths on an FEC-element basis so as to route the labeled traffic through the network to the egress node.

According to the above-described invention, the apparatus for selection of paths to route the incoming traffic through the communication network is effective in dispersing the traffic load to the selected paths on the network and in optimizing the use of network resources. The traffic load dispersion to the selected paths can be effectively suited to the network management conditions specified by a network administrator.

The invention further provides an ingress-node apparatus for selection of paths to route incoming traffic through a communication network in which a plurality of label switched paths between an ingress node and an egress node are provided, and the incoming traffic at the ingress node is labeled and delivered through the network to the egress node, and one of a set of priorities is assigned for each of the plurality of physical links and the plurality of label switched paths being allocated to the physical links. An FEC allocation unit allocates a plurality of forwarding equivalent class (FEC) elements of the incoming traffic at the ingress node for the plurality of label switched paths in order of the respective priorities of the plurality of physical links until an amount of the traffic delivered on one of the plurality of physical links having a first priority exceeds a predetermined threshold; and a traffic delivery unit delivers the labeled traffic on the plurality of label switched paths on an FEC-element basis so as to route the labeled traffic through the network to the egress node. After the amount of the traffic delivered on the one of the plurality of physical links has exceeded the predetermined threshold, the traffic is routed to others of the plurality of physical links having a second priority lower than the first priority of the one of the plurality of physical links.

According to the above-described invention, the apparatus for selection of paths to route the incoming traffic through the communication network is effective in dispersing the traffic load to the selected paths on the network and in optimizing the use of network resources. By assigning the first priority for main route paths of the network and the second priority for sub-route paths of the network, the traffic load dispersion to the selected paths can be effectively achieved.

The invention further provides an ingress-node apparatus for selection of paths to route incoming traffic through a communication network in which a plurality of label switched paths between an ingress node and an egress node are provided, and the incoming traffic at the ingress node is labeled and delivered through the network to the egress node, a plurality of FEC priorities being allocated for a plurality of forwarding equivalent class FEC elements of the incoming traffic at the ingress node, and one of a set of priorities being assigned for each of the plurality of physical links and the plurality of label switched paths being allocated to the plurality physical links. An FEC allocation unit allocates the plurality of FEC elements of the incoming traffic at the ingress node for the plurality of label switched paths in order of the respective priorities of the plurality of label switched paths and in order of the respective FEC priorities of the plurality of FEC elements; and a traffic delivery unit delivers the labeled traffic on the plurality of label switched paths on an FEC-element basis so as to route the labeled traffic through the network to the egress node.

According to the above-described invention, the apparatus for selection of paths to route the incoming traffic through the communication network is effective in dispersing the traffic load to the selected paths on the network and in optimizing the use of network resources. The traffic load dispersion to the selected paths can be achieved with increased flexibility by the allocation of the path priorities and the FEC priorities specified by a network administrator.

BRIEF DESCRIPTION OF THE DRAWINGS

FIG. 3 is a diagram for explaining an FEC (Forward Equivalent Class) routing table in the ingress LSR.

FIG. 4 is a diagram for explaining an FEC-label mapping table in the ingress LSR.

FIG. 5 is a diagram for explaining an FEC-label mapping table in a first preferred embodiment of the ingress LSR.

FIG. 6 is a diagram for explaining an FEC-label mapping table in a second preferred embodiment of the ingress LSR.

FIG. 7 is a diagram for explaining an FEC-label mapping table in a third preferred embodiment of the ingress LSR.

FIG. 8 is a diagram for explaining an FEC-label mapping table in a fourth preferred embodiment of the ingress LSR.

FIG. 9 is a diagram for explaining an FEC-label mapping table in the fourth preferred embodiment of the ingress LSR FIG. 10 is a diagram for explaining an FEC-label mapping table in a fifth preferred embodiment of the ingress LSR.

DETAILED DESCRIPTION

A description will now be provided of preferred embodiments of the present invention with reference to the accompanying drawings.

The scheme of MultiProtocol Label Switching MPLS adaptive traffic engineering (often called MATE) has the potential for effectively optimizing the use of network resources. In order to achieve this scheme, it is desired to provide a data communication network having a capability of selecting a plurality of paths passing through a router at an arbitrary node of the network when transmitting data on the network.

For example, when the traffic load on a certain path becomes too heavy, another path having a larger capacity can be selected for transmitting the traffic through the other path with the large capacity, rather than through the overloaded path. Hence, by making use of the MPLS, the traffic load can be effectively dispersed to the selected paths on the network and a long-term congestion state of the network can be avoided. If a plurality of label switched paths within the MPLS network are predefined for transmitting the incoming traffic addressed to a same destination according to the load dispersion capability of the MPLS, it is possible to disperse the incoming traffic load to the selected ones of the plurality of paths by routing the majority part of the incoming traffic to the selected paths and the remainder to other paths of the plurality of paths. In addition to the load dispersion capability provided by the MPLS, it is possible to attach a small, much-abbreviated label in the packet header, which is arbitrarily selected regardless of the IP address of the packet. Hence, it is possible to easily carry out the load dispersion routing to the label switched paths.

Figure 1:
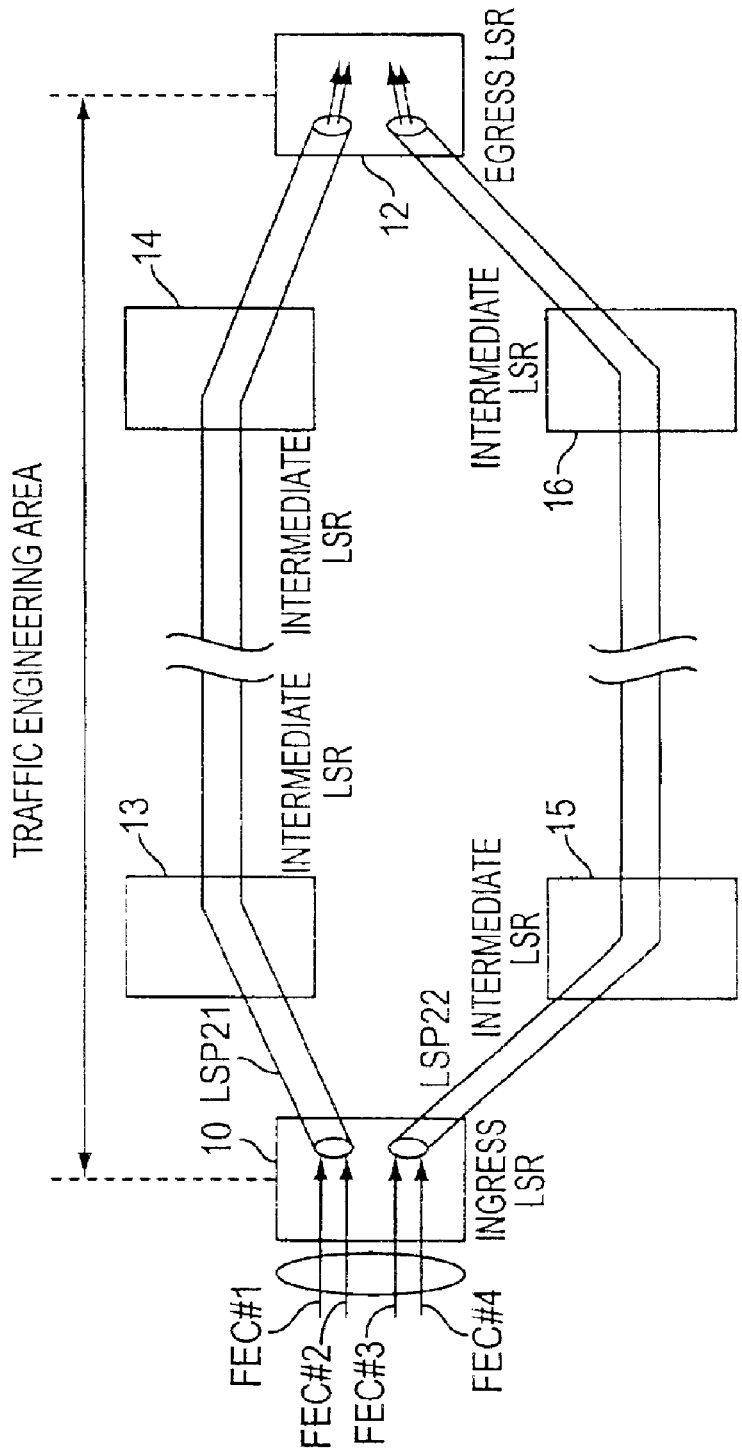
FIG. 1 is a diagram for explaining the concept of LSP (Label Switched Path) load dispersion in MPLS adaptive traffic engineering (MATE) according to the path selection method of the invention.

Further, in the MPLS scheme, an incoming data packet at the ingress node of the network is grouped into a plurality of FEC (forwarding equivalent class) elements, and the plurality of FEC elements of the packet are allocated for the plurality of label switched paths on the network on an FEC-element basis. The grouping of the packet into the FEC elements can be arbitrarily performed, which need not be in conformity with the full IP address carried by the packet. For example, the grouping of the packet into the FEC elements may be performed by using either the prefix or part of the IP address of the packet or the destination IP address of the packet. FIG. 1 shows the concept of the label switched path (LSP) load dispersion in the MPLS adaptive traffic engineering (MATE) according to the method of the present invention.

Figure 14:
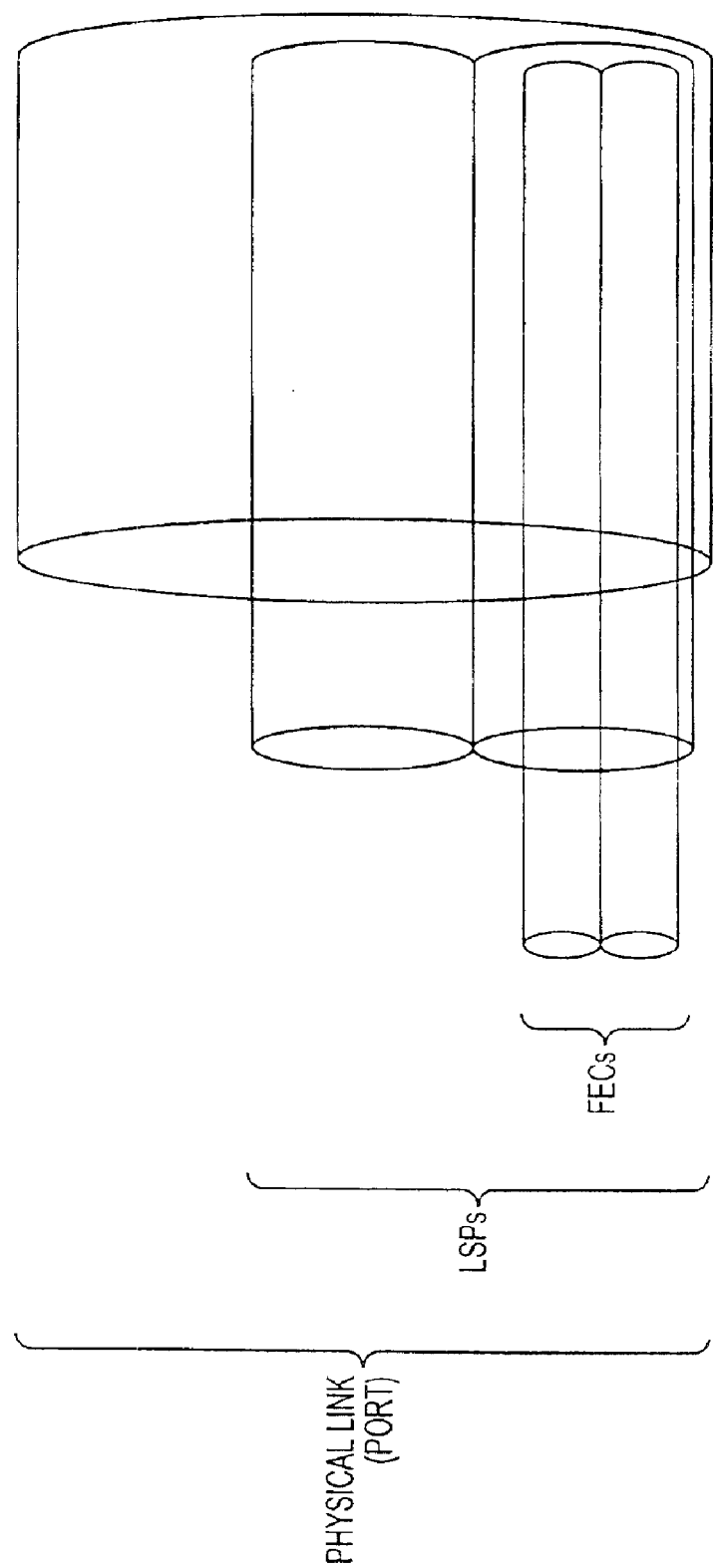
FIG. 14 is a diagram for explaining the relationship between a physical link (port), LSPs, and FECs.

FIG. 14 shows the concept of the relationship between a physical link (port), label switched paths, and forward equivalent class elements (FECs).

In FIG. 1, a traffic engineering area of a label switching network (hereinafter called MPLS network) between ingress LSR (label switching router) 10 and an egress LSR 12 is illustrated. In the traffic engineering area between the ingress LSR 10 and the egress LSR 12, a label switched path (LSP) 21 and a label switched path (LSP) 22 are predefined.

For the sake of simplicity of description, suppose that only two LSPs are provided in the traffic engineering area of the MPLS network. However, it would be readily understood that three or more LSPs may be provided in the traffic engineering area of the MPLS network. Further, the data rate of the physical link of LSP 21 and the data rate of the physical link of LSP 22 may be different from each other. Generally, a packet-switched network, such as the MPLS network, can carry out data-rate conversion. Two routers of different data rates can exchange packets, since each connects to its node at its proper data rate.

Suppose that, in the MPLS network of FIG. 1, the LSP 21 extends from the ingress LSR 10 to the egress LSR 12 through two intermediate LSRs 13 and 14, while the LSP 22 extends from the ingress LSR 10 to the egress LSR 12 through two intermediate LSRs 15 and 16.

In accordance with network management conditions specified by a network administrator, an incoming data packet at the ingress LSR 10 is grouped into a plurality of FEC elements, such as FEC#1, FEC#2, FEC#3 and FEC#4, and the plurality of FEC elements of the incoming packet are allocated for the label switched paths 21 and 22. Hereinafter, FEC# 1 and others are called FEC IDs. One or more FEC elements can be allocated for a single label switched path and one or more label switched paths may be allocated to a single physical link. A plurality of FEC IDs are predetermined for the FEC elements allocated for the label switched paths 21 and 22 at the ingress LSR 10.

In the present embodiment, as shown in FIG. 1, the FEC #1 and the FEC #2 are allocated for the LSP 21, and the FEC #3 and the FEC #4 are allocated for the LSP 22. In order to attain the LSP load dispersion on the MPLS network, the distribution of data elements of the incoming packet to the respective label switched paths within the MPLS network in the present embodiment is performed on an FEC-element basis.

Further, suppose that the MPLS network of the present embodiment to which the MPLS adaptive traffic engineering is applied is intended for speeding up data communication over an ATM network. Suppose that a separate IP-based network, other than the ATM network, is connected to the egress edge of the MPLS network of the present embodiment.

Figure 2:
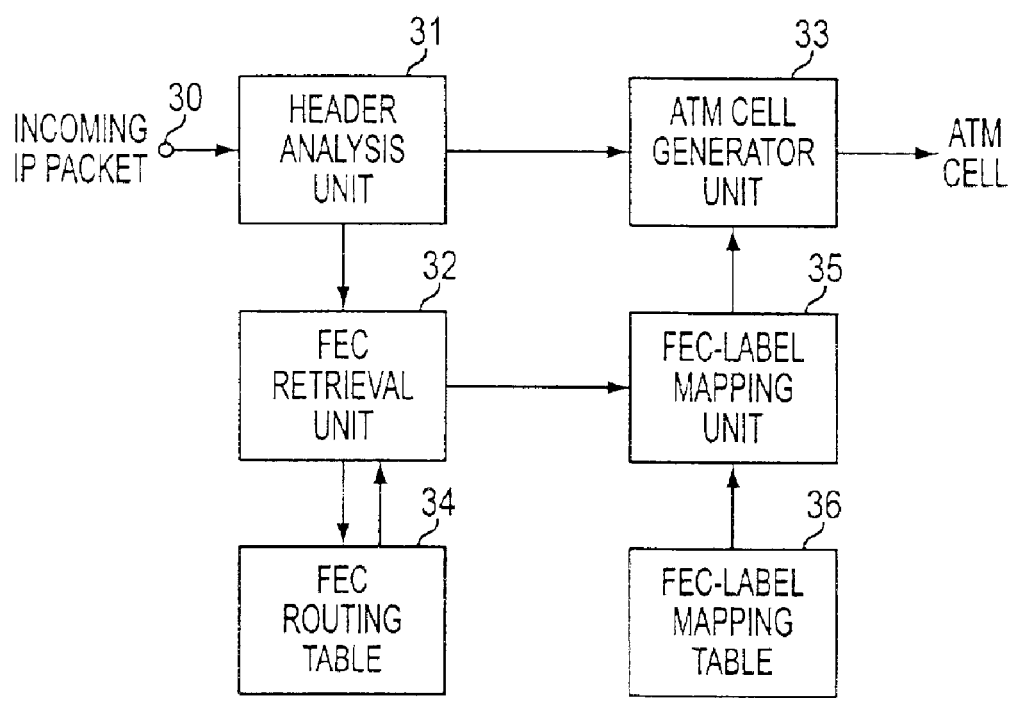
FIG. 2 is a block diagram of an ingress LSR (Label Switched Router) on an MPLS network to which the MPLS adaptive traffic engineering is applied.

FIG. 2 is a block diagram of the ingress LSR 10 on the MPLS network to which the MPLS adaptive traffic engineering is applied.

As shown in FIG. 2, the ingress LSR 10 generally comprises a header analysis unit 31, an FEC retrieval unit 32, an FEC routing table 34, an ATM cell generator unit 33, an FEC-label mapping unit 35, and an FEC-label mapping table 36. As a stream of IP data packets enter the ingress edge of the MPLS network, the first incoming data packet is received at an input terminal 30 of the header analysis unit 31.

In the ingress LSR of FIG. 2, the header analysis unit 31 analyzes the IP packet header, which precedes the incoming data packet. The header analysis unit 31 reads, from the header, a source IP address, a destination IP address, a source TCP/UDP port identifier, a destination TCP/UDP port identifier. The header analysis unit 31 supplies the read header elements to the FEC retrieval unit 32, and, in parallel to this, the header analysis unit 31 supplies the data packet to the ATM cell generator unit 33.

In the ingress LSR of FIG. 2, the FEC retrieval unit 32 produces a specific FEC ID (and its FEC priority) from the received header elements (the source IP address, the destination IP address, the source TCP/UDP port ID, the destination TCP/UDP port ID) by retrieving the FEC routing table 34 (shown in FIG. 3) based on the received header elements. The specific FEC ID, obtained by the FEC retrieval unit 32, is used to determine a forwarding equivalent class FEC to which the incoming data packet pertains.

FIG. 3 shows an FEC routing table 34 in the ingress LSR of FIG. 2. For example, the FEC routing table 34 is stored in a memory of the ingress LSR 10. As shown in FIG. 3, the FEC routing table 34 contains a plurality of records corresponding to a plurality of predetermined FEC IDs, each record having a source IP address field, a destination IP address field, a source TCP/UDP port ID field, a destination TCP/UDP port ID field, and an FEC priority field, corresponding to one of the plurality of predetermined FEC IDs allocated for the label switched paths 21 and 22.

In the FEC routing table of FIG. 3, the source IP address field defines an IP address of a source terminal or an IP address of an external network including the source terminal. In a case of the source terminal's IP address, the source IP address is a unique, 32-bit terminal address identifier that is expressed in dotted decimal form with four address fields, such as "10.25.1.1". In a case of the network's IP address, the source IP address is a unique network address identifier that is expressed in dotted decimal form with four address fields with a prefix, such as "10.25.2.0/24". The prefix "/24" in the example "10.25.2.0/24" means that only the upper 24 bits of the 32-bit identifier are valid to identify the source network address, that is, the source network IP address is "10.25.2".

In the FEC routing table of FIG. 3, the destination IP address field defines an IP address of a destination terminal or an IP address of an external network including the destination terminal. In a case of the destination terminal's IP address, the destination IP address is a unique, 32-bit terminal address identifier that is expressed in dotted decimal form with four address fields, such as "10.25.1.1". In a case of the network's IP address, the destination IP address is a unique network address identifier that is expressed in dotted decimal form with four address fields with a prefix, such as "10.25.2.0/24". The prefix "/24" in the example "10.25.2.0/24" means that only the upper 24 bits of the 32-bit identifier are valid to identify the destination network address, that is, the destination network's IP address is "10.25.2".

In the FEC routing table of FIG. 3, the source TCP/UDP port ID field defines a TCP (transmission control protocol) port identifier or UDP (user datagram protocol) port identifier of the source terminal. The source TCP/UDP port ID is obtained by reading the TCP/UDP packet header included in the IP packet. For example, the source TCP/UDP port ID "20", shown in FIG. 3, means that an FTP (file transfer protocol) application as a TCP layer application, is the source of the incoming IP packet.

In the FEC routing table of FIG. 3, the destination TCP/UDP port ID field defines a TCP port identifier or UDP port identifier of the destination terminal. The destination TCP/UDP port ID is obtained by reading the TCP/UDP packet header included in the IP packet. The FEC routing table of FIG. 3 contains both the source TCP/UDP port ID field and the destination TCP/UDP port ID field. Generally, the port ID, designated by the client, is exchanged between the client and the server. However, it is uncertain whether the client or the server is the source terminal or the destination terminal. Hence, the FEC routing table of FIG. 3 contains both the source port ID field and the destination port ID field.

Further, in the FEC routing table of FIG. 3, the FEC priority field defines an FEC priority that is used to set a specific priority level for one of the plurality of predetermined FEC IDs allocated for the label switched paths 21 and 22.

In the ingress LSR of FIG. 2, the FEC retrieval unit 32 supplies the specific FEC ID (and its FEC priority), obtained by retrieving the FEC routing table 34 based on the above packet header elements, to the FEC-label mapping unit 35.

The FEC-label mapping unit 35 is connected to the FEC-label mapping table 36, and produces a specific label value and a specific output port ID from the received FEC ID by retrieving the FEC-label mapping table 36 (which is shown in FIG. 4) based on the FEC ID. The FEC-label mapping unit 35 supplies the label value and the output port ID to the ATM cell generator unit 33.

FIG. 4 shows an FEC-label mapping table 36 in the ingress LSR of FIG. 2. For example, the FEC-label mapping table 36 is stored in a memory of the ingress LSR 10. As shown in FIG. 4, the FEC-label mapping table 36 contains a plurality of records corresponding to the plurality of predetermined FEC IDs, each record having a label value address field and an output port ID, corresponding to one of the plurality of predetermined FEC IDs allocated for the label switched paths. In the example of FIG. 4 there are four label switched paths and each label switched path is allocated to a different physical link.

As shown in FIG. 4, the predetermined FEC IDs, such as #1, #2, etc., in the FEC-label mapping table are the same as those corresponding elements in the FEC routing table of FIG. 3. The label value field of each record in the FEC-label mapping table of FIG. 4 defines a label value corresponding to one of the predetermined FEC IDs, such as L0, L1, etc. The output port ID field in the FEC-label mapping table defines an output port ID corresponding to one of the predetermined FEC IDs, such as P0, P1, etc. FIG. 14 shows the relationship between the output port, label switched paths, and the FECs.

In the ingress LSR of FIG. 2, the ATM cell generator unit 33 generates an ATM cell from the IP data packet sent by the header analysis unit 31. In parallel to this, the ATM cell generator unit 33 produces a label from the label value sent by the FEC-label mapping unit 35, and attaches the label to the header (the VPI/VCI field) of the ATM cell. In the header format of the ATM cell, the virtual path identifier (VPI) is 8 bits at the user-network interface and 12 bits at the network-network interface, allowing for more virtual paths to be supported within the network. The virtual channel identifier (VCI) is used for routing to and from the end user.

The ATM cell generator unit 33 delivers the labeled ATM cell from its output port indicated by the output port ID (sent by the FEC-label mapping unit 35), to the individual downstream LSR on the MPLS network.

A description will now be given of a first preferred embodiment of the path selection method and apparatus of the present invention with reference to FIG. 5.

FIG. 5 shows an FEC-label mapping table in the first preferred embodiment of the ingress LSR on the MPLS network.

In the present embodiment, the ingress LSR 10 generally comprises the header analysis unit 31, the FEC retrieval unit 32, the FEC routing table 34, the ATM cell generator unit 33, the FEC-label mapping unit 35 and the FEC-label mapping table 36, which are essentially the same as corresponding elements in FIG. 2 except that the FEC-label mapping table 36 in the present embodiment is configured as shown in FIG. 5, and the FEC-label mapping unit 35 produces the label value and the output port ID in response to the FEC ID by retrieving the FEC-label mapping table of FIG. 5.

As shown in FIG. 5, in the FEC-label mapping table 36 of the present embodiment, the plurality of FEC elements of the incoming traffic at the ingress node of the MPLS network are equally allocated for the plurality of label switched paths (LSPs). Suppose that, in the example of FIG. 5, the number of the FEC IDs in the FEC-label mapping table 36 is 10, and the number of the output ports in the table 36 is 5. In this example the number of output ports corresponds to the number of LSPs in the network by chance. In such a case, two of the ten FEC IDs are allocated to one of the five output port IDs as shown in FIG. 5. The relationship between the FEC IDs, the label switched paths, and the physical link (output port) is shown in FIG. 15.

Figure 15:
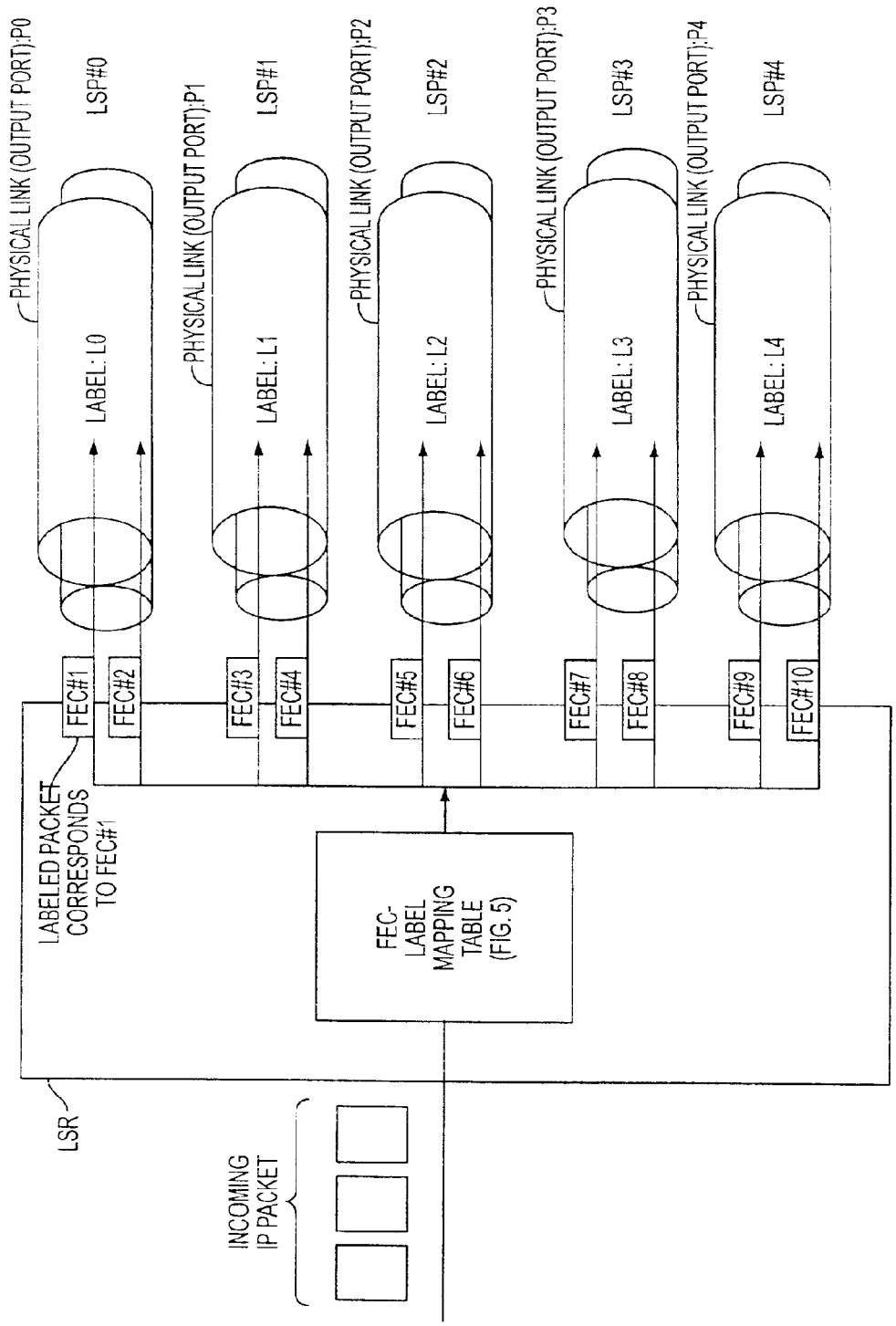
FIG. 15 is a diagram for explaining packet forwarding using the FEC-Label Mapping Table of FIG. 5.

In the ingress LSR 10 in which the FEC-label mapping table 36 of FIG. 5 is incorporated, the FEC retrieval unit 32 and the FEC-label mapping unit 35 equally allocate the plurality of FEC elements of the incoming traffic at the ingress node for the plurality of LSPs, as shown in FIG. 15. The ATM cell generator unit 33 delivers the labeled traffic on the plurality of LSPs on an FEC-element basis so as to route the labeled traffic through the MPLS network to the egress node.

In the present embodiment, the plurality of FEC elements of the incoming traffic at the ingress node are equally allocated for the label switched paths and the label switched paths are equally allocated to the physical links, and the labeled traffic is delivered on the selected paths on an FEC-element basis. The path selection method and apparatus of the present embodiment is effective in dispersing the traffic load to the selected paths on the network and in optimizing the use of network resources. In particular, the reversing of the sequence of data packets sent by the same terminal, at the egress node (the egress LSR 12) of the network can be effectively prevented. Although the FEC IDs are equally allocated in this embodiment that would not necessarily have to be the case.

In the above-described embodiment, the delivery of the labeled traffic on the selected paths is performed at the ingress LSR 10 on an FEC-element basis. Alternatively, the delivery of the labeled traffic on the selected paths may be performed on a packet basis. In the alternative embodiment, it is possible to effectively disperse the traffic load on the individual paths into the selected paths. However, if the incoming traffic is divided into a series of packets, such packets will be delivered on different paths of the network to the egress node. In such a case, it is necessary that the egress LSR 12 reassemble the packets, received from the different paths, into the original message.

A description will now be given of a second preferred embodiment of the path selection method and apparatus of the present invention with reference to FIG. 6.

FIG. 6 shows an FEC-label mapping table in the second preferred embodiment of the ingress LSR on the MPLS network.

In the present embodiment, the ingress LSR 10 generally comprises the header analysis unit 31, the FEC retrieval unit 32, the FEC routing table 34, the ATM cell generator unit 33, the FEC-label mapping unit 35 and the FEC-label mapping table 36, which are essentially the same as corresponding elements in FIG. 2 except that the FEC-label mapping table 36 in the present embodiment is configured as shown in FIG. 6, and the FEC-label mapping unit 35 produces the label value and the output port ID in response to the FEC ID by retrieving the FEC-label mapping table of FIG. 6.

As shown in FIG. 6, in the FEC-label mapping table 36 of the present embodiment, the plurality of FEC elements of the incoming traffic at the ingress node of the MPLS network are allocated for the plurality of LSPs such that the respective LSPs which are allocated to physical links which have predetermined data rates and the number of FEC elements, allocated for each physical link, is proportional to the predetermined data rate of that physical link.

Suppose that, in the example of FIG. 6, the number "M" of the FEC IDs in the FEC-label mapping table 36 is 10, and the number of the output ports in the table 36 is 3. Further, in the example of FIG. 6, the corresponding physical link for the output port P0 has a first data rate "a" (=1 Mbps), the corresponding physical link for the output port P1 has a second data rate "b" (=3 Mbps), and the corresponding physical link for the output port P2 has a third data rate "c" (=6 Mbps).

In the above-mentioned case, the number of FEC elements allocated for the LSP1 (which is indicated by "L0"), the number of FEC elements allocated for the LSP2, LSP3, and LSP4 (which is indicated by "L1–L3"), and the number of FEC elements allocated for the LSP5–LSP10 (which is indicated by "L4–L9") are determined in accordance with the following equations.

$L0=M*a/(a+b+c)$ $L1-L3=M*b/(a+b+c)$ $L4-L9=M*c/(a+b+c)$

Substituting M=10, a=1, b=3, and c=6 into the above equations yields L0=1, L1–L3=3 and L4–L9=6. As in the FEC-label mapping table of FIG. 6, the FEC#1 is allocated for the output port P0 (corresponding to the LSP1 in this example), the FEC#2, FEC#3 and FEC#4 are allocated for the output port P1 (corresponding to the L1–L3 in this example), and the FEC#5–FEC#10 are allocated for the output port P2 (corresponding to the L4–L9 in this example).

In the ingress LSR 10 in which the FEC-label mapping table 36 of FIG. 6 is incorporated, the FEC retrieval unit 32 and the FEC-label mapping unit 35 allocate the plurality of FEC elements of the incoming traffic at the ingress node for the plurality of LSPs such that the number of FEC elements allocated for each of the LSPs is proportional to the predetermined data rate of the physical link. The ATM cell generator unit 33 delivers the labeled traffic on the plurality of LSPs on an FEC-element basis so as to route the labeled traffic through the MPLS network to the egress node.

In the present embodiment, the plurality of FEC elements of the incoming traffic at the ingress node are allocated for the label switched paths in the data-rate-proportional manner, and the labeled traffic is delivered on the selected paths on an FEC-element basis. The path selection method and apparatus of the present embodiment is effective in dispersing the traffic load to the selected paths on the network and in optimizing the use of network resources. In particular, concentration of the traffic load on a specific path of the network can be effectively avoided. This will be effective in preventing the slowness of data transmission on the communication network caused by the delay of the specific path where the traffic load is concentrated.

A description will now be given of a third preferred embodiment of the path selection method and apparatus of the present invention with reference to FIG. 7.

FIG. 7 shows an FEC-label mapping table in the third preferred embodiment of the ingress LSR on the MPLS network.

In the present embodiment, the ingress LSR 10 generally comprises the header analysis unit 31, the FEC retrieval unit 32, the FEC routing table 34, the ATM cell generator unit 33, the FEC-label mapping unit 35 and the FEC-label mapping table 36, which are essentially the same as corresponding elements in FIG. 2 except that the FEC-label mapping table 36 in the present embodiment is configured as shown in FIG. 7, and the FEC-label mapping unit 35 produces the label value and the output port ID in response to the FEC ID by retrieving the FEC-label mapping table of FIG. 7.

As shown in FIG. 7, in the FEC-label mapping table 36 of the present embodiment, the plurality of FEC elements of the incoming traffic at the ingress node of the MPLS network are allocated for the plurality of LSPs. The plurality LSPs is tied to the physical links such that the respective physical links have predetermined weight factors, and the number of FEC elements, allocated for each physical link, is proportional to the predetermined weight factor of that physical link.

Suppose that, in the example of FIG. 7, the number "M" of the FEC IDs in the FEC-label mapping table 36 is 10, and the number of the output ports in the table 36 is 3. Further, in the example of FIG. 7, the corresponding LSP1 and LSP2 for the output port P0 has a first weight factor "w1" (=20%), the corresponding LSP3–LSP7 for the output port P1 has a second weight factor "w2" (=50%), and the corresponding LSP8–LSP10 for the output port P2 has a third weight factor "w3" (=30%).

In the above-mentioned case, the number of FEC elements allocated for the LSP1 and LSP2 (which is indicated by "L0 and L1"), the number of FEC-elements allocated for the LSP3–LSP7 (which is indicated by "L2–L6"), and the number of FEC elements allocated for the LSP8–LSP10 (which is indicated by "L7–L9") are determined in accordance with the following equations.

$$L0-L1 = M*w1/(w1+w2+w3)$$

$$L2-L6 = M*w2/(w1+w2+w3)$$

$$L7-L9 = M*w3/(w1+w2+w3)$$

Substituting M=10, w1=20%, b=50%, and c=30% into the above equations yields L0–L1=2, L2–L6=5, and L7–L9=3. As in the FEC-label mapping table of FIG. 7, the FEC#1 and FEC#2 are allocated for the output port P0, the FEC#3–FEC#7 are allocated for the output port P1, and the FEC#8–FEC#10 are allocated for the output port P2.

In the ingress LSR 10 in which the FEC-label mapping table 36 of FIG. 7 is incorporated, the FEC retrieval unit 32 and the FEC-label mapping unit 35 allocate the plurality of FEC elements of the incoming traffic at the ingress node for the plurality of LSPs such that the number of FEC elements allocated for each of the LSPs is proportional to the predetermined weight factor of the physical link. The ATM cell generator unit 33 delivers the labeled traffic on the plurality of LSPs on an FEC-element basis so as to route the labeled traffic through the MPLS network to the egress node.

In the present embodiment, the plurality of FEC elements of the incoming traffic at the ingress node are allocated for the plurality of label switched paths (LSPs) in the weight-factor-proportional manner, and the labeled traffic is delivered on the selected paths on an FEC-element basis. The path selection method and apparatus of the present embodiment is effective in dispersing the traffic load to the selected paths on the network and in optimizing the use of network resources. In particular, by determining the weight factors of the plurality of LSPs to appropriate values or the weight factors of the physical links, the traffic load dispersion to the selected paths can be effectively suited to the network management conditions specified by the network administrator.

A description will now be given of a fourth preferred embodiment of the path selection method and apparatus of the present invention with reference to FIG. 8 and FIG. 9.

FIG. 8 shows an FEC-label mapping table in the fourth preferred embodiment of the ingress LSR before an amount of the traffic delivered on the physical link P0 having a first priority exceeds a predetermined threshold. FIG. 9 shows an FEC-label mapping table in the fourth preferred embodiment of the ingress LSR after the amount of the traffic delivered on the physical link P0 has exceeded the threshold.

In the present embodiment, the ingress LSR 10 generally comprises the header analysis unit 31, the FEC retrieval unit 32, the FEC routing table 34, the ATM cell generator unit 33, the FEC-label mapping unit 55 and the FEC-label mapping table 36, which are essentially the same as corresponding elements in FIG. 2 except that the FEC-label mapping table 36 in the present embodiment is configured as shown in FIG. 8 or FIG. 9, and the FEC-label mapping unit 35 produces the label value and the output port ID in response to the FEC ID by retrieving the FEC-label mapping table of FIG. 8 or FIG. 9.

Suppose that, in the present embodiment, one of a set of priorities is assigned for each of the plurality of physical links within the MPLS network. Any number of label switched paths may be allocated to each of the plurality of physical links such that it may be considered that the label switched paths assigned to the physical link have the priority of the physical link.

As shown in FIG. 8, in the FEC-label mapping table 36 of the present embodiment, the plurality of FEC elements of the incoming traffic at the ingress node of the MPLS network are allocated for the plurality of LSPs in order of the respective priorities of the plurality of LSPs before an amount of the traffic delivered on one of the plurality of physical links having a first priority exceeds a predetermined threshold. Specifically, in the example of FIG. 8, the FEC#1, FEC#2 and FEC#3 are allocated for the first-priority L0, L1 and L2 corresponding to the output port P0 before the amount of the traffic delivered on the physical link having the first priority exceeds the threshold.

As shown in FIG. 9, after the amount of the traffic delivered on the physical link having the first priority has exceeded the threshold, in the FEC-label mapping table 36 of the present embodiment, the remainders of the plurality of FEC elements of the incoming traffic at the ingress node of the MPLS network are allocated to others of the plurality of physical links having a second priority lower than the first priority. Specifically, in the example of FIG. 9, the FEC#4 and FEC#5 (the subsequent ones of the plurality of FEC elements of the incoming traffic) are allocated for the second-priority physical link corresponding to the output port P1 after the amount of the traffic delivered on the physical link having the first priority has exceeded the threshold.

In the ingress LSR 10 in which the FEC-label mapping table 36 of FIG. 8 or FIG. 9 is incorporated, the FEC retrieval unit 32 and the FEC-label mapping unit 35 allocate the plurality of FEC elements of the incoming traffic at the ingress node for the plurality of LSPs in order of the respective priorities of the plurality of physical link before the amount of the traffic delivered on one of the plurality of physical links having a first priority exceeds a predetermined threshold. After the amount of the traffic on the physical link has exceeded the threshold, the FEC retrieval unit 32 and the FEC-label mapping unit 35 allocate the remainders of the plurality of FEC elements of the traffic for others of the plurality of LSPs having physical links of a second priority lower than the first priority. The ATM cell generator unit 33 delivers the labeled traffic on the plurality of LSPs on an FEC-element basis so as to route the labeled traffic through the MPLS network to the egress node, wherein, after the amount of the traffic on the physical link has exceeded the threshold, the traffic is routed to others of the plurality of LSPs having physical links of a second priority lower than the first priority.

In the present embodiment, an estimated amount of the traffic delivered on each of the plurality of physical links in the MPLS network can be calculated at the ingress LSR 10. For the purpose of the calculation of the estimated load on one of the plurality of physical links, the algorithm of the MPLS adaptive traffic engineering (MATE) proposed by the IETF (Internet Engineering Task Force) may be used.

The scheme of the MATE has the potential for more effectively optimizing the use of network resources as compared with that in the conventional IP-based communication networks. In the present embodiment, which makes use of the scheme of the MATE, when the load of the traffic on a certain path becomes too heavy, another path having a larger capacity can be selected for transmitting the traffic through the other path with the large capacity, rather than through the overloaded path. Hence, by making use of the MATE, the path selection method and apparatus of the present embodiment can effectively disperse the incoming traffic load to the selected paths on the network and a long-term congestion state of the network can be avoided.

In the present embodiment, the plurality of FEC elements of the incoming traffic at the ingress node are allocated for the plurality of LSPs in order of the respective priorities of the plurality of LSPs, and the labeled traffic is delivered on the selected paths on an FEC-element basis. The path selection method and apparatus of the present embodiment is effective in dispersing the traffic load to the selected paths on the network and in optimizing the use of network resources. In particular, by assigning the first priority for main route paths of the network and the second priority for sub-route paths of the network, the traffic load dispersion to the selected paths can be effectively achieved.

A description will now be given of a fifth preferred embodiment of the path selection method and apparatus of the present invention with reference to FIG. 10.

FIG. 10 shows an FEC-label mapping table in the fifth preferred embodiment of the ingress LSR on the MPLS network.

In the present embodiment, the ingress LSR 10 generally comprises the header analysis unit 31, the FEC retrieval unit 32, the FEC routing table 34, the ATM cell generator unit 33, the FEC-label mapping unit 35 and the FEC-label mapping table 36, which are essentially the same as corresponding elements in FIG. 2 except that the FEC-label mapping table 36 in the present embodiment is configured as shown in FIG. 10, and the FEC-label mapping unit 35 produces the label value and the output port ID in response to the FEC ID by retrieving the FEC-label mapping table of FIG. 10.

Suppose that, in the present embodiment, one of a set of priorities is assigned for each of the plurality of LSPs within the MPLS network, and a plurality of FEC priorities are allocated for the plurality of FEC elements of the incoming traffic at the ingress node. In the present embodiment, the correlation between the FEC IDs and the FEC priorities is provided by the FEC routing table shown in FIG. 3, and the FEC retrieval unit 32 supplies, to the FEC-label mapping unit 35, the correlated FEC priority, obtained from the specific FEC ID by retrieving the FEC routing table of FIG. 3.

As shown in FIG. 10, in the FEC-label mapping table 36 of the present embodiment, the plurality of FEC elements of the incoming traffic at the ingress node of the MPLS network are allocated for the plurality of LSPs in order of the respective priorities of the plurality of LSPs and in order of the respective FEC priorities of the plurality of FEC elements.

Specifically, in the example of FIG. 10, a first FEC priority "0" is allocated for the LSP1 (with the first priority) corresponding to the output port "P0", a second FEC priority "1" is allocated for the LSP2 (with the second priority) corresponding to the output port "P1", a third FEC priority "2" is allocated for the LSP3 (with the third priority) corresponding to the output port "P2", a fourth FEC priority "3" is allocated for the LSP4 (with the fourth priority) corresponding to the output port P3, and fifth through seventh FEC priorities "5" to "7" are allocated for the LSP5 (with the low priority) corresponding to the output port P4.

In the ingress LSR 10 in which the FEC-label mapping table 36 of FIG. 10 is incorporated, the FEC retrieval unit 32 and the FEC-label mapping unit 35 allocate the plurality of FEC elements of the incoming traffic at the ingress node for the plurality of LSPs in order of the respective priorities of the plurality of LSPs and in order of the respective FEC priorities of the plurality of FEC elements. The ATM cell generator unit 33 delivers the labeled traffic on the plurality of LSPs on an FEC-element basis so as to route the labeled traffic through the MPLS network to the egress node.

In the present embodiment, the plurality of FEC elements of the incoming traffic at the ingress node are allocated for the plurality of LSPs in order of the respective priorities of the plurality of LSPs and in order of the respective FEC priorities of the plurality of FEC elements, and the labeled traffic is delivered on the selected paths on an FEC-element basis. The path selection method and apparatus of the present embodiment is effective in dispersing the traffic load to the selected paths on the network and in optimizing the use of network resources. In particular, the traffic load dispersion to the selected paths can be achieved with increased flexibility by the allocation of the path priorities and the FEC priorities specified by the network administrator.

As has been described in the foregoing, the application of the path selection method and apparatus of the present invention to a packet-switched network makes it possible to disperse the incoming traffic load to the selected label switched paths. Further, it is possible to more effectively optimize the use of network resources as compared with that in the conventional IP-based communication networks. In addition, the traffic load dispersion to the selected paths can be achieved with increased flexibility by the allocation of the path priorities and the FEC priorities specified by the network administrator.

In each of the intermediate label switching routers (LSRs) 13 through 16 on the MPLS network, the incoming traffic at the input of each intermediate LSR is a labeled ATM cell. Each intermediate LSR reads an input label from the header of the labeled ATM cell, produces an output label corresponding to the input label, attaches the output label in the header of an outgoing ATM cell, and delivers the labeled ATM cell from its output port to a downstream LSR on the MPLS network.

Figures 11, 12:
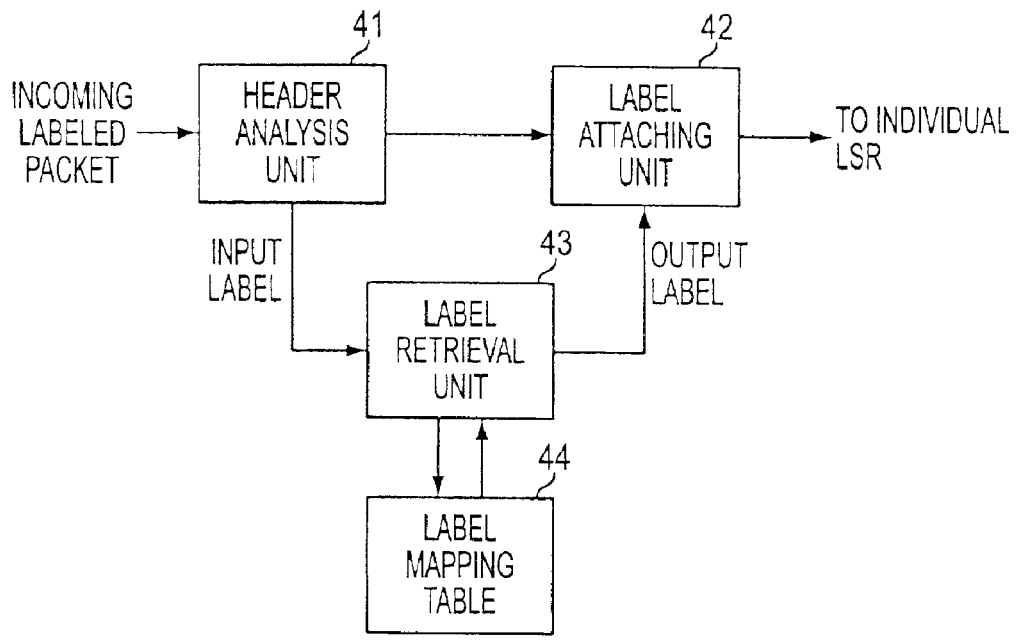
FIG. 11 is a block diagram of an intermediate LSR on the MPLS network.
FIG. 12 is a diagram for explaining a label mapping table in the intermediate LSR.

FIG. 11 is a block diagram of one of the intermediate LSRs 13 through 16 on the MPLS network.

In the intermediate LSR of FIG. 11, an incoming labeled ATM cell is received at a header analysis unit 41. The header analysis unit 41 analyzes the header of the ATM cell, reads, from the header, a label value (called the input label), and supplies the input label to a label retrieval unit 43.

The label retrieval unit 43 is connected to a label mapping table 44. The label retrieval unit 43 produces an output label value (called the output label) and an output port ID from the received input label by retrieving the label mapping table 44 based on the input label.

FIG. 12 shows a label mapping table 44 in the intermediate LSR of FIG. 11. As shown in FIG. 12, the label mapping table 44 contains a plurality of records corresponding to a plurality of predetermined input labels, such as IL0, IL1, etc. Each record includes an output label field and an output port ID field, which correspond to one of the predetermined input labels.

In the label mapping table of FIG. 12, the output label field defines an output label or a label value corresponding to one of the predetermined input labels, such as OL0, OL1, etc. The output port ID field defines an output port ID corresponding to one of the predetermined input labels, such as P0, P1, etc.

The label retrieval unit 43 supplies the output label and the output port ID, obtained from the label mapping table 44, to a label attaching unit 42.

The label attaching unit 42 receives the ATM cell sent by the header analysis unit 41, and attaches the output label, received from the label retrieval unit 43, in the header (the VPI/VPO field) of the received ATM cell. The label attaching unit 42 delivers the labeled ATM cell from its output port indicated by the output port ID (sent by the label retrieval unit 43), to the individual downstream LSR on the MPLS network.

Figure 13:
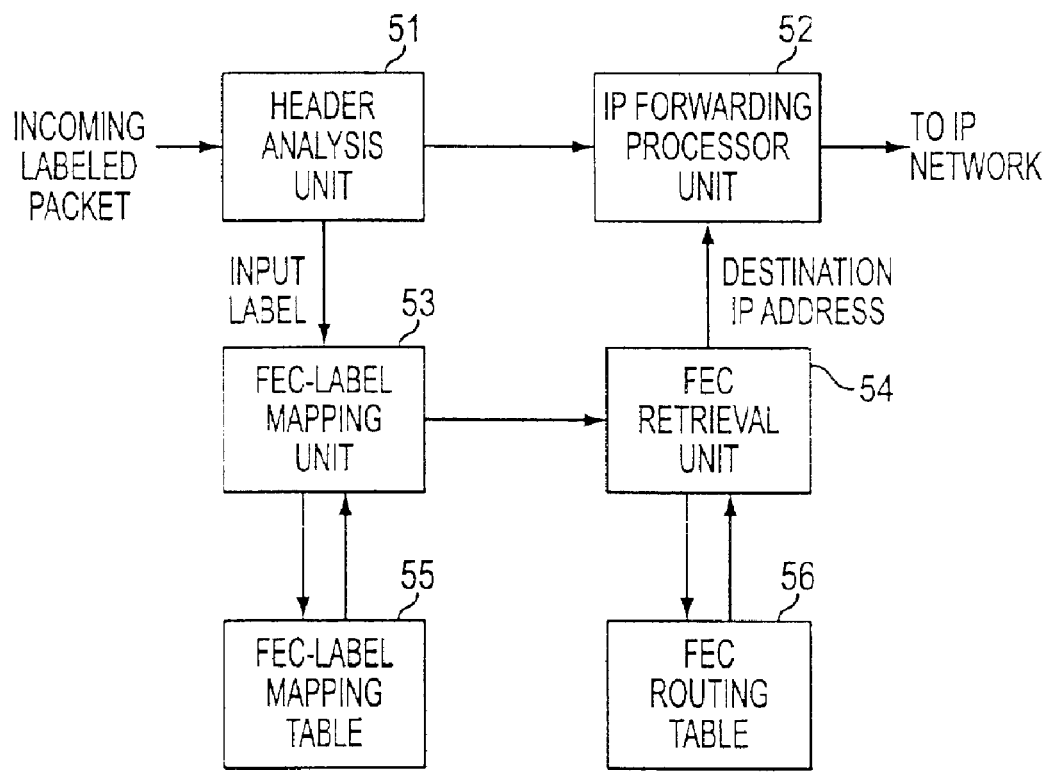
FIG. 13 is a block diagram of an egress LSR on the MPLS network.

FIG. 13 is a block diagram of the egress LSR 12 on the MPLS network.

In the egress LSR of FIG. 13, an incoming labeled ATM cell is received at a header analysis unit 51. The header analysis unit 51 analyzes the header of the ATM cell, reads, from the header, a label value (called the input label), and supplies the input label to an FEC-label mapping unit 53.

The FEC-label mapping unit 53 is connected to an FEC-label mapping table 55. The FEC-label mapping unit 53 produces an FEC ID (called output label) from the received input label by retrieving the FEC-label mapping table 55 based on the input label. The FEC-label mapping table 55 is configured in a manner that is essentially the same as the FEC-label mapping table shown FIG. 4. The FEC-label mapping unit 53 supplies the FEC ID (the output label), obtained from the FEC-label mapping table 55, to an FEC retrieval unit 54.

The FEC retrieval unit 54 is connected to an FEC routing table 56. The FEC retrieval unit 54 produces a destination IP address and a destination TCP/UDP port ID from the received FEC ID by retrieving the FEC routing table 56 based on the FEC ID (the output label). The FEC routing table 56 is configured in a manner that is essentially the same as the FEC routing table shown in FIG. 3. The FEC retrieval unit 54 supplies the destination IP address and the destination TCP/UDP port ID, obtained from the FEC routing table 56, to an IP forwarding processor unit 52.

The IP forwarding processor unit 52 receives the ATM cell sent by the header analysis unit 51, and reassembles the IP data packet from the received ATM cell. The IP forwarding processor unit 52 attaches the destination IP address, received from the FEC retrieval unit 54, in the header of the reassembled IP data packet. The IP forwarding processor unit 52 delivers the labeled IP data packet from its output port indicated by the destination TCP/UDP port ID (received from the FEC retrieval unit 54) to the destination of the external IP network (indicated by the destination IP address).

The present invention is not limited to the above-described embodiments, and variations and modifications may be made without departing from the scope of the present invention. For example, in the above-described embodiments, data communication in the traffic engineering area between the ingress node (the ingress LSR 10) and the egress node (the egress LSR 12) is carried out through the ATM network. Alternatively, an IP packet-switched network, a frame relay network, a point-to-point link or the like may be used, instead of the ATM network, as the communication medium through which the data is transmitted.

In the above-described embodiments, the ingress LSR 10 of FIG. 1 corresponds to the ingress node or the ingress-node apparatus. The egress LSR 12 of FIG. 1 corresponds to the egress node. The elements 32, 34, 35 and 36 of FIG. 2 wherein the FEC routing table 34 is configured as shown in FIG. 3 and the FEC-label mapping table 36 is configured as shown in any of FIG. 4, FIG. 5, FIG. 6, FIG. 7, FIG. 8 (or FIG. 9) and FIG. 10, correspond to the FEC allocation unit or the allocating step. The elements 31 and 33 of FIG. 2 correspond to the traffic delivery unit or the delivering step.

As has been described above the method for selection of paths to route the incoming traffic through the communication network is effective in dispersing the traffic load to the selected paths on the network and in optimizing the use of network resources. Reversing of a sequence of data packets sent by the same terminal, at the egress node of the network can be effectively reduced.

Further, the method for selection of paths to route the incoming traffic through the communication network is effective in dispersing the traffic load to the selected paths on the network and in optimizing the use of network resources. Concentration of the traffic load on a specific path of the network can be effectively reduced.

Further, the method for selection of paths to route the incoming traffic through the communication network is effective in dispersing the traffic load to the selected paths on the network and in optimizing the use of network resources. The traffic load dispersion to the selected paths can be effectively suited to the network management conditions specified by a network administrator.

In addition, the method for selection of paths to route the incoming traffic through the communication network is effective in dispersing the traffic load to the selected paths on the network and in optimizing the use of network resources. By assigning the first priority for main route paths of the network and the second priority for sub-route paths of the network, the traffic load dispersion to the selected paths can be effectively achieved.

Further, the method for selection of paths to route the incoming traffic through the communication network is effective in dispersing the traffic load to the selected paths on the network and in optimizing the use of network resources. The traffic load dispersion to the selected paths can be achieved with increased flexibility by the allocation of the path priorities and the FEC priorities specified by a network administrator.

The apparatus for selection of paths to route the incoming traffic through the communication network is effective in dispersing the traffic load to the selected paths on the network and in optimizing the use of network resources. Reversing of a sequence of data packets sent by the same terminal, at the egress node of the network can be effectively prevented.

The apparatus for selection of paths to route the incoming traffic through the communication network is effective in dispersing the traffic load to the selected paths on the network and in optimizing the use of network resources. Concentration of the traffic load on a specific path of the network can be effectively avoided.

The apparatus for selection of paths to route the incoming traffic through the communication network is effective in dispersing the traffic load to the selected paths on the network and in optimizing the use of network resources. The traffic load dispersion to the selected paths can be effectively suited to the network management conditions specified by a network administrator.

The apparatus for selection of paths to route the incoming traffic through the communication network is effective in dispersing the traffic load to the selected paths on the network and in optimizing the use of network resources. By assigning the first priority for main route paths of the network and the second priority for sub-route paths of the network, the traffic load dispersion to the selected paths can be effectively achieved.

The apparatus for selection of paths to route the incoming traffic through the communication network is effective in dispersing the traffic load to the selected paths on the network and in optimizing the use of network resources. The traffic load dispersion to the selected paths can be achieved with increased flexibility by the allocation of the path priorities and the FEC priorities specified by a network administrator.

What is claimed is:

1. A method for selecting paths to route incoming traffic through a communication network in which a plurality of label switched paths between an ingress node and an egress node are provided, and the incoming traffic at the ingress node is labeled and delivered through the network to the egress node, said method comprising the steps of:
    allocating a plurality of forwarding elements of the incoming traffic at the ingress node to each label switched path of the plurality of label switched paths;
    delivering the labeled traffic on the plurality of label switched paths; and
    routing the labeled traffic through the network to the egress node.

2. The apparatus of claim 1, wherein the delivery step delivers the labeled traffic on a forwarding elements basis.

3. The apparatus of claim 1, wherein the forwarding elements are forwarding equivalent class elements FEC and the delivery step delivers the labeled traffic on an FEC elements basis.

4. The apparatus of claim 1, wherein the allocating step further allocates the plurality of forwarding elements equally among the plurality of label switched paths.

5. The apparatus of claim 1, wherein each label switched path of the plurality of label switched paths is associated with a physical link.

6. The apparatus of claim 5, wherein the allocating step further allocates the plurality of forwarding elements equally among a plurality of forwarding links.

7. A method for selecting paths to route incoming traffic through a communication network in which a plurality of label switched paths between an ingress nod and an egress node are provided, each label switched path of the plurality of label switched paths being associated with a physical link having a data rate, and the incoming traffic at the ingress node is labeled and delivered through the network to the egress node, said method comprising the steps of:
    allocating a plurality of forwarding elements of the incoming traffic at the ingress node to each label switched path of the plurality of label switched paths, the number of forwarding elements allocated to each of the label switched paths being proportional to the data rate of the respective associated physical link;
    delivering the labeled traffic on the plurality of label switched paths on a forwarding element basis; and
    routing the labeled traffic through the network to the egress node.

8. A method for selecting paths to route incoming traffic through a communication network in which a plurality of label switched paths between an ingress node and an egress node are provided, and the incoming traffic at the ingress node is labeled and delivered through the network to the egress node, said method comprising the steps of:
    allocating a plurality of forwarding elements of the incoming traffic at the ingress node to the plurality of label switched paths, each respective label switched path having a weight factor, and the number of forwarding elements allocated to each of the label switched paths being proportional to the weight factor of the label switched path;
    delivering the labeled traffic on the plurality of label switched paths on a forwarding element basis; and
    routing the labeled traffic through the network to the egress node.

9. The method of claim 8, wherein each label switched path of the plurality of label switched paths is associated with a physical link having said weight factor.

10. A method for selecting paths to route incoming traffic through a communication network in which a plurality of label switched paths between an ingress nod and an egress node are provided, and the incoming traffic at the ingress node is labeled and delivered through the network to the egress node, said method comprising the steps of:
    assigning a priority from a set of priorities to each label switched path of the plurality of label switched paths;
    allocating a plurality of forwarding elements of the incoming traffic at the ingress node to a plurality of label switched paths in order of the respective priorities of the plurality of label switched paths, the incoming traffic being allocated to label switched paths having a first priority until an amount of traffic exceeds a predetermined threshold;
    delivering the labeled traffic on the plurality of label switched paths on a forwarding element basis; and
    routing the labeled traffic through the network to the egress node;
    wherein after the amount of traffic delivered on said label switched paths having a first priority has exceeded the predetermined threshold, the traffic is allocated to others of the plurality of label switched paths having a second priority lower than the first priority of said one of the plurality of label switched paths.

11. A method for selecting paths to route incoming traffic through a communication network in which a plurality of label switched paths between an ingress nod and an egress node are provided, and the incoming traffic at the ingress node is labeled and delivered through the network to the egress node, said method comprising the steps of:

allocating a plurality of forwarding priorities to a plurality of forwarding elements of the incoming traffic at the ingress node;

assigning a priority from a set of priorities to each label switched path of the plurality of label switched paths;

allocating the plurality of forwarding elements of the incoming traffic at the ingress node to the plurality of label switched paths in order of the respective priorities of the plurality of label switched paths and in order of the respective forwarding priorities of the plurality of forwarding elements;

delivering the labeled traffic on the plurality of label switched paths on a forwarding element basis; and routing the labeled traffic through the network to the egress node.

12. The method of claim 11, wherein after an amount of traffic delivered on a label switched path having a first priority has exceeded a predetermined threshold, the traffic is allocated to other label switched paths of the plurality of label switched paths having a second priority lower than the label switched path having the first priority.

13. An ingress-node apparatus that selects paths to route incoming traffic through a communication network in which a plurality of label switched paths between an ingress node and an egress node are provided, and the incoming traffic at the ingress node is labeled and delivered through the network to the egress node, said apparatus comprising:

an allocation unit for allocating a plurality of forwarding elements of the incoming traffic at the ingress node to each label switched path of the plurality of label switched paths; and a traffic delivery unit for delivering the labeled traffic on the plurality of label switched paths so as to route the labeled traffic through the network to the egress node.

14. The apparatus of claim 13, wherein the traffic delivery unit delivers the labeled traffic on a forwarding element bases.

15. The apparatus of claim 13, wherein the forwarding elements are forwarding equivalent class elements FEC and the traffic delivery unit delivers the labeled traffic in an FEC elements basis.

16. The apparatus of claim 13, wherein the allocation unit further allocates the plurality of forwarding elements equally among the plurality of label switched paths.

17. The apparatus of claim 13, wherein each label switched path of the plurality of label switched paths is associated with a physical link.

18. The apparatus of claim 17, wherein the allocation unit further allocates the plurality of forwarding elements equally among a plurality of physical links.

19. An ingress-node apparatus that selects paths to route incoming traffic through a communication network in which a plurality of label switched paths between an ingress node and an egress node are provided, and the incoming traffic at the ingress node is labeled and delivered through the network to the egress node, said apparatus comprising:

an allocation unit for allocating a plurality of forwarding elements of the incoming traffic at the ingress node to each label switched path of the plurality of label switched paths, the respective label switched paths being associated with a physical link having a data rate, and the number of forwarding elements allocated to each of the label switched paths being proportional to the data rate of the associated physical link; and a traffic delivery unit for delivering the labeled traffic on the plurality of label switched paths and for routing the labeled traffic through the network to the egress node.

20. An ingress-node apparatus that selects paths to route incoming traffic through a communication network in which a plurality of label switched paths between an ingress node and an egress node are provided, and the incoming traffic at the ingress node is labeled and delivered through the network to the egress node, said apparatus comprising:

an allocation unit for allocating a plurality of forwarding elements of the incoming traffic at the ingress node to the plurality of label switched paths, each respective label switched path having a weight factor, and the number of forwarding elements allocated for each of the label switched paths being proportional to the weight factor of the respective label switched path; and a traffic delivery unit for delivering the labeled traffic on the plurality of label switched paths on a forwarding element basis and for routing the labeled traffic through the network to the egress node.

21. An ingress-node apparatus that selects paths to route incoming traffic through a communication network in which a plurality of label switched paths between an ingress node and an egress node are provided, and the incoming traffic at the ingress node is labeled and delivered through the network to the egress node, and a priority of a set of priorities is assigned to teach label switched path of the plurality of label switched paths, said apparatus comprising:

an allocation unit for allocating a plurality of forwarding elements of the incoming traffic at the ingress node to each label switched path of the plurality of label switched paths in order of the respective priorities of the plurality of label switched paths, an amount of traffic is delivered to label switched paths having a first priority until the amount exceeds a predetermined threshold; and a traffic delivery unit for delivering the labeled traffic on the plurality of label switched paths on a forwarding element basis and for routing the labeled traffic through the network to the egress node, wherein after the amount of traffic delivered to the label switched paths having a first priority has exceeded the predetermined threshold, the traffic is routed to others of the plurality of label switched paths having a second priority lower than the label switched paths having a first priority.

22. An ingress-node apparatus that selects paths to route incoming traffic through a communication network in which a plurality of label switched paths between an ingress node and an egress node are provided, and the incoming traffic at the ingress node is labeled and delivered through the network to the egress node, a plurality of forwarding priorities being allocated for a plurality of forwarding elements of the incoming traffic at the ingress node, and a priority of a set of priorities being assigned to each label switched path of the plurality of label switched paths, said apparatus comprising:

an allocation unit for allocating a plurality of forwarding elements of the incoming traffic at the ingress node to the plurality of label switched paths in order of the respective priorities of the plurality of label switched paths and in order of the respective forwarding priorities of the plurality of forwarding elements; and a traffic delivery unit for delivering the labeled traffic on the plurality of label switched paths on a forwarding element basis and for routing the labeled traffic through the network to the egress node.

23. The apparatus of claim 22, wherein after an amount of traffic delivered to a label switched path having a first priority has exceeded a predetermined threshold, the traffic is router to other label switched paths of the plurality of label switched paths having a lower priority that the label switched paths having a first priority.

24. The apparatus of claim 23, wherein the label switched path having a first priority is a plurality of label switched paths having a first priority.

25. A communication network in which a plurality of label switched paths are provided and incoming traffic is labeled and delivered through the network, said communications network comprising:

an ingress unit where the incoming traffic is received and grouped into a plurality of forwarding elements, each forwarding element of the plurality of forwarding elements is allocated to a label switched path of the plurality of label switched paths, and the forwarding elements are labeled and delivered to the respective label switched paths for routing the labeled traffic through the network; and an egress unit that receives the labeled traffic from the plurality of label switched paths and removes the labels and reassembles the outgoing traffic.

26. The communication network of claim 25, wherein the incoming traffic is grouped into a plurality of forwarding equivalent class (FEC) elements and the FEC elements are allocated to the plurality of label switched paths on an FEC element basis.

27. The communication network of claim 26, further comprising:

an allocating unit for equally allocating the FEC elements of the incoming traffic at the ingress node among the plurality of label switched paths.

28. The communication network of claim 26, further comprising:

an allocating unit for allocating a number of FEC elements of the incoming traffic at the ingress node among the plurality of label switched paths in proportion to a data rate of each label switched path, wherein each label switched path of the plurality of label switched paths being associated with the physical link having a respective data rate.

29. The communication network of claim 28, wherein the data rate of each label switched path is determined in proportion to an associated physical link data rate.

30. The communication network of claim 29, further comprising:

an allocating unit for allocating a number of FEC elements of the incoming traffic at the ingress node in proportion to a weight factor of the respective label switched path, wherein each label switched path of the plurality of label switched paths having a weight factor.

31. The communication network of claim 30, wherein the weight factor of each label switched path is determined in proportion to an associated physical link weight factor.

32. The communication network of claim 26, further comprising:

an assigning unit for assigning each label switched path of the plurality of label switched paths a priority from among a set of priorities, an allocating unit for allocating the FEC elements of the incoming traffic at the ingress node to the label switched paths in order of the respective priorities of the plurality of label switched paths, and allocating the traffic to others of the plurality of label switched paths having a second priority lower than label switched paths having a first priority after an amount of traffic delivered to the label switched paths having a first priority has exceeded a predetermined threshold.

33. The communication network of claim 26, further comprising:

am assigning unit for assigning the FEC elements of the incoming traffic at the ingress node FEC priorities from a plurality of FEC priorities, a mapping unit for mapping a priority from among a set of priorities to each label switched path of the plurality of label switched paths, an allocating unit for allocating the FEC elements of the incoming traffic at the ingress node to the label switched paths in order of the respective priorities of the plurality of label switched paths and in order of the respective FEC priorities of the plurality of FEC elements, and allocating the traffic to others of the plurality of label switched paths having a second priority lower than label switched paths with a first priority after an amount of traffic delivered to the label switched paths having a first priority has exceeded a predetermined threshold.

* * * * *